US006281920B1

(12) United States Patent
Agano

(10) Patent No.: US 6,281,920 B1
(45) Date of Patent: Aug. 28, 2001

(54) IMAGE RECORDING APPARATUS

(75) Inventor: Toshitaka Agano, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/109,160

(22) Filed: Jul. 2, 1998

(30) Foreign Application Priority Data

Jul. 3, 1997 (JP) .................................................. 9-178480

(51) Int. Cl.⁷ ........................................................ B41J 2/36
(52) U.S. Cl. ........................... 347/188; 347/240; 347/251
(58) Field of Search .................................... 347/188, 189, 347/187, 240, 251, 254, 183, 184; 399/44, 66, 46

(56) References Cited

U.S. PATENT DOCUMENTS 5,294,959 * 3/1994 Nagao et al. ............................ 399/44
5,383,032 * 1/1995 Eguchi et al. ......................... 358/448
5,719,540 * 2/1998 Takaoka et al. ........................ 335/35

FOREIGN PATENT DOCUMENTS

333724/1996    12/1996   (JP) .

* cited by examiner

Primary Examiner—N. Le
Assistant Examiner—Hai C. Pham
(74) Attorney, Agent, or Firm—Sughrue, Mion, Zinn, Macpeak & Seas, PLLC

(57) ABSTRACT

The improved image recording apparatus that performs image recording on a recording material to output a print with a record of a visible image includes an outputting device of a print having printed thereon a minimum density in the recording material, a measurement device for measuring the minimum density that has been recorded on the print, and a control device by which tones to be recorded are controlled in accordance with the minimum density measured by the measurement device. The image recording apparatus that uses various recording materials including light-sensitive materials and thermal recording materials and which, in spite of the fluctuation in the fog density of a particular recording material or the difference in characteristics between production lots and other identifications of the recording material, is capable of consistent recording of high-quality images that assure satisfactory tone representation over the entire density range including low densities.

21 Claims, 4 Drawing Sheets

IMAGE RECORDING APPARATUS

BACKGROUND OF THE INVENTION

This invention relates to the art of image recording apparatus, particularly an apparatus which, in spite of the fluctuation in the fog density of a recording material to be used, is capable of recording high-quality images that assure satisfactory tone representation over the entire density range.

Image recording apparatus such as copiers and printers are extensively used in diverse fields by employing various recording materials including silver salt photographic materials, thermally processable light-sensitive materials, light- and heat-sensitive recording materials, electrophotographic materials and thermal recording materials. In the case of using a light-sensitive recording material, it is imagewise exposed with recording light such as an optical beam modulated in accordance with the image to be recorded or the light reflected from the original and if a print with a record of a visible (developed) image is necessary, the recording material is subjected to an appropriate development scheme, for example, wet development using various processing solutions if the recording material is a silver salt photographic material, or thermal development if it is a thermally processable light-sensitive material.

In the case of using a thermal recording material, it is imagewise heated to develop color by means of a thermal head having a number of heating elements arranged in one direction or a thermal recording light beam such as a laser beam and this produces a print with a record of a visible image.

In image recording apparatus using the various recording materials described above, a minimum density (highlight) that can be recorded is generally determined by a characteristic of the recording material to be used, namely, its fog density. Consider, for example, a negative recording material that forms color in recorded areas; depending on the characteristics of the recording material, its base density and other factors, there occurs some color formation (density development) in non-recorded areas and this density which is commonly referred to as "fog density" is a minimum density that can be recorded.

The fog density of a virgin recording material (under pre-exposure storage) varies with time, typically toward a higher value. In spite of this fact, the conventional image recording apparatus is operated under constant recording conditions and if the fog density fluctuates, the low-density areas of the recorded image will become "soft" to deteriorate the print quality.

SUMMARY OF THE INVENTION

The present invention has been accomplished under these circumstances and has as an object providing an image recording apparatus that uses various recording materials including light-sensitive materials and thermal recording materials and which, in spite of the fluctuation in the fog density of a particular recording material or the difference in fog density between production lots and other identifications of the recording material, is capable of consistent recording of high-quality images that assure satisfactory tone representation over the entire density range including low densities.

This object of the invention can be attained by an image recording apparatus that performs image recording on a recording material to output a print with a record of a visible image, which comprises a means of outputting a print having printed thereon a minimum density in said recording material, a means of measurement for measuring said minimum density that has been recorded on said print, and a control means by which tones to be recorded are controlled in accordance with the minimum density measured by said means of measurement.

Preferably, the tones to be recorded are controlled by said control means which determines a difference between said measured minimum density and a standard minimum density of said recording material and raises an image density over an entire density range or in a partial density range in accordance with the thus determined difference.

Preferably, the image density is raised over the entire density range by increasing a target density value of the recorded image by said difference. Alternatively, the target density value is increased in a density range below a specified level, preferably below 1.0 in terms of density D, in accordance with said difference such that said measured minimum density is approached asymptotically by said target density value.

Preferably, said recording material is a light- and heat-sensitive recording material, and said apparatus further comprises a plurality of supply trays for accommodating the recording materials.

Preferably, said supply trays accommodate the recording materials of different sizes, respectively.

DETAILED DESCRIPTION OF THE INVENTION

On the pages that follow, the image recording apparatus of the invention is described in detail by referring to the preferred embodiments shown in the accompanying drawings.

Figure 1:
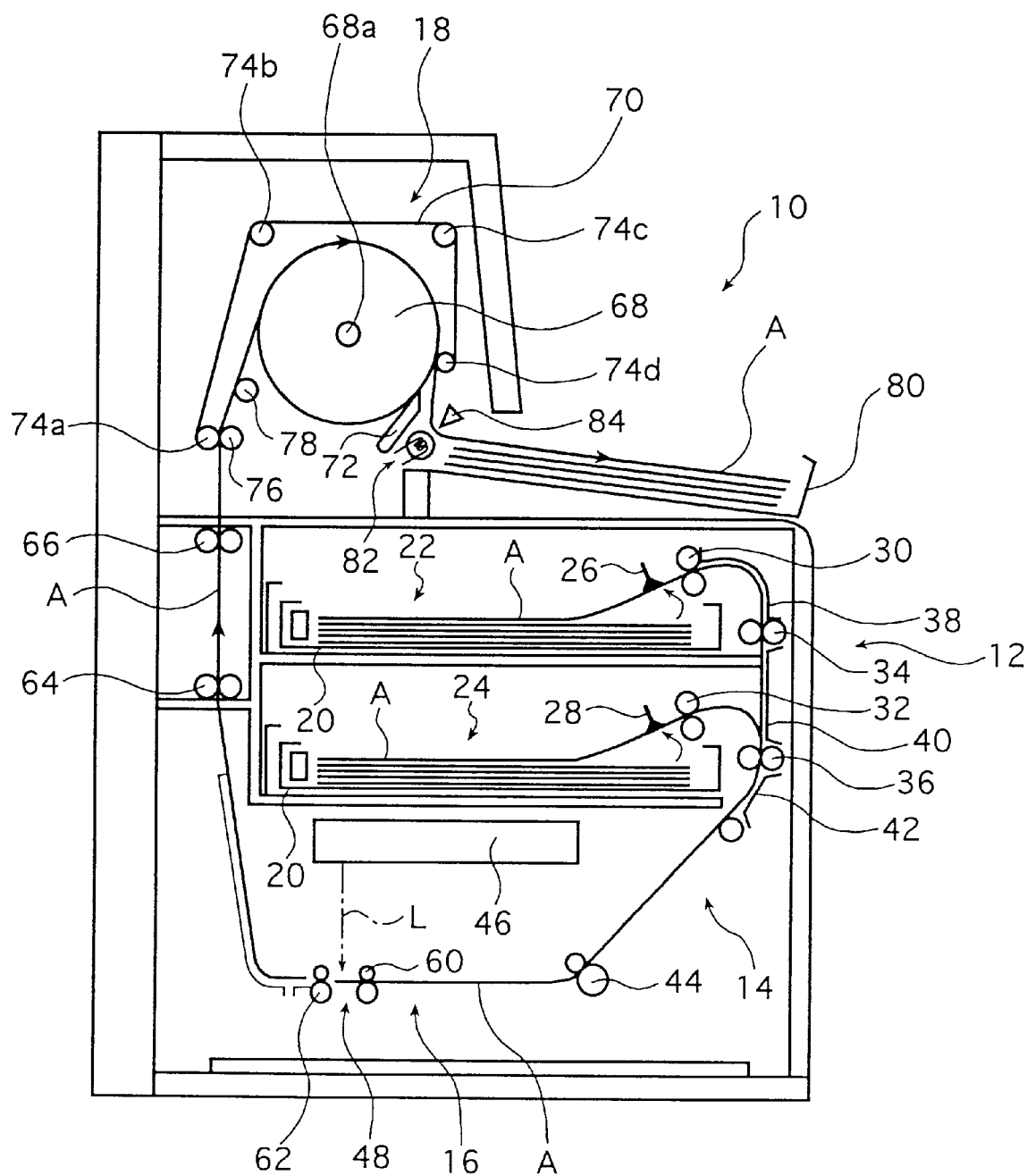
FIG. 1 shows schematically an example of the image recording apparatus of the invention.

FIG. 1 shows schematically an example of the image recording apparatus of the invention. The image recording apparatus indicated generally by 10 in FIG. 1 may advantageously be used as a so-called "medical imager" that produces prints showing visible reproductions of images outputted from medical diagnostic apparatus such as CT and MRI. The apparatus 10 uses a light- and heat-sensitive recording material that employs a transparent film as a support. The recording material indicated by A is subjected to imagewise exposure by scanning with an optical beam L modulated in accordance with the image data supplied from an image data supply source R such as MRI and the resulting latent image is thermally developed to produce a print with a record of a visible image.

The light- and heat-sensitive recording material to be used on the recording apparatus 10 may be exemplified by one comprising a support and an image forming layer provided on one side thereof that uses a latex as the major component (>50%) of the binder and which contains both an organic silver salt and a reducing agent therefor. Upon exposure, a photocatalyst such as the light-sensitive silver halide in the recording material forms nuclei of a latent image and, upon heating, the silver in the organic silver salt that has been ionized by the action of the reducing agent moves to bind with the light-sensitive silver halide to form silver crystals, thereby forming an image.

Another example of the light- and heat-sensitive recording material is a thermal color forming recording material that comprises a support and a light- and heat-sensitive recording layer provided thereon that contains heat-responsive microcapsules incorporating an electron-imparting achromatic dye, a compound having both an electron-receptive part and a polymerizable vinyl monomer part within the same molecule, and a photopolymerization initiator. Alternatively, the compound may be replaced by separate physical entities of an electron-receptive compound and a polymerizable vinyl monomer.

The mechanism of action of this recording material is as follows. Upon exposure, the composition located outside the heat-responsive microcapsules hardens to become fixed; upon heating, the compound containing the electron-receptive part and the polymerizable vinyl monomer part or the electron-receptive compound, both compound being yet to be fixed, will move around within the light- and heat-sensitive recording layer, whereupon the electron-imparting achromatic dye within the microcapsules produce color to form an image.

For details of the light- and heat-sensitive recording material just described above briefly, see the specification of commonly assigned Japanese Patent Application No. 333724/1996.

It should be added that the applicability of the image recording apparatus of the invention is in no way limited to image recording using the light- and heat-sensitive recording material as described above; the apparatus can also be implemented in various models that employ diverse recording materials to produce prints (hard copies) with a record of visible image. Two specific examples include an image recording apparatus that performs imagewise exposure on a silver salt photographic material and which then performs a wet development process to produce prints and an image recording apparatus that employs a heat developable silver salt light-sensitive material that produces prints by transferring an image to an image-receiving material having an image-receiving layer (dye-fixing layer) in the presence of an image forming solvent (the second type of recording material is available as a "pictrographic light-sensitive material" from Fuji Photo Film Co., Ltd.)

Besides the image recording apparatus using the above-described light-sensitive materials, the present invention is also applicable with advantage to a thermal recording apparatus, or an image recording apparatus that produces prints with a record of visible image from a thermal recording material by imagewise heating with a thermal head comprising a number of heating elements arranged in one direction or a heating laser beam (from a heat-mode laser).

The illustrated recording apparatus 10 comprises basically the following five sections which, in order from the upstream to downstream end of the transport of the recording material A, are a light-sensitive material supply section 12, a width adjusting section 14, an image exposing part 16, a thermal developing section 18 and an ejecting tray 80. Provided between the thermal developing section 18 and the ejecting tray 80 are a light source 82 and a sensor 84 which, in combination, measure the density of the recording material A that has passed through the thermal development cycle so as to detect a minimum density in the recording material A, namely, its fog density.

Although omitted from FIG. 1 in order to simplify the representation in the drawing, thereby clarifying the construction of the recording apparatus 10, components other than those shown in FIG. 1, for example, transport rollers and guides for transporting the light-sensitive material A, as well as various types of sensor may optionally be provided in the apparatus.

The recording material A is typically in the form of a stack (or bundle) of a specified number of sheets, say, 100 sheets that are packaged in bags and so forth or tied up with a band and so forth. Typically, the stack or bundle consisting of a specified number of sheets is accommodated in a dedicated magazine or supply tray 20, from which individual sheets of the recording material are fed one by one into the recording apparatus 10.

The light-sensitive material supply section 12 (which is hereinafter referred to as "supply section 12") is a site at which a sheet of light-sensitive material A is picked up and supplied to the width adjusting section 14 which is located downstream the transport of the light-sensitive material A (the term "downstream" as used hereinafter shall be referenced to this direction). The supply section 12 comprises loading zones 22 and 24, a sheet-fee ding means using a sucker 26 and a supply roller pair 30 which are provided in the loading zone 22, another sheet-feeding means using a sucker 28 and a supply roller pair 32 that are provided in the loading zone 24, transport roller pairs 34 and 36, as well as transport guides 38, 40 and 42.

The loading zones 22 are sites at which magazines or supply trays 20 accommodating the recording material A are to be loaded in specified positions. The illustrated recording apparatus 10 has two loading zones 22 and 24 which are typically loaded with magazines 20 for accommodating recording materials A of different sizes [one of which may be a 356×432 mm size for use in CT or MRI and the other being a B4 size (257×364 mm) for use in FCR (FUJI COMPUTED RADIOGRAPHY)].

The sheet-feeding means provided in the loading zone 22 (or 24) holds the recording material A in position by sucking with sucker 26 (or 28) and transports it by moving the sucker 26 (or 28) by a known moving means such as a link mechanism so that it is fed into the supply roller pair 30 (or 32) also provided in the loading zone 22 (or 24).

The recording material A fed into the supply roller pair 30 is guided by the transport guides 38, 40 and 42 as it is transported by the transport roller pairs 34 and 36 to be directed to the downstream width-adjusting section 14. Similarly, the recording material A fed into the supply roller pair 32 is guided by the transport guides 40 and 42 as it is transported by the transport roller pair 36 to be directed to the downstream width-adjusting section 14.

The width-adjusting section 14 is a site at which the recording material A is properly positioned in a direction perpendicular to its transport (said direction is hereinafter referred to as a "widthwise direction") such that the recording material A in the downstream recording section 16 will be properly positioned in a main scanning direction (i.e., to ensure "side registration") and subsequently, the recording material A is transported to the downstream image exposing section 16 by means of a transport roller pair 44.

The method of ensuring side registration in the width-adjusting section 14 is not limited in any particular way and various known methods may be employed, two of which are mentioned here: the combination of a registering plate that performs the intended positioning by touching one end face of the recording material A in its widthwise direction and a pushing means that pushes the recording material A in its widthwise direction until an end face of it touches the registering plate; and the combination of the same registering plate and a suitable means such as a guide plate that is movable in accordance with the size of the recording material A in its widthwise direction and which regulates the direction of transport of the recording material A in its widthwise direction until it similarly touches the registering plate.

The image exposing section 16 (which is hereinafter referred to as "exposing section 16") is a site at which the recording material A is exposed imagewise by scanning with an optical beam and it comprises an exposing unit 46 and a means of transport 48 in an auxiliary scanning direction.

Figure 2:
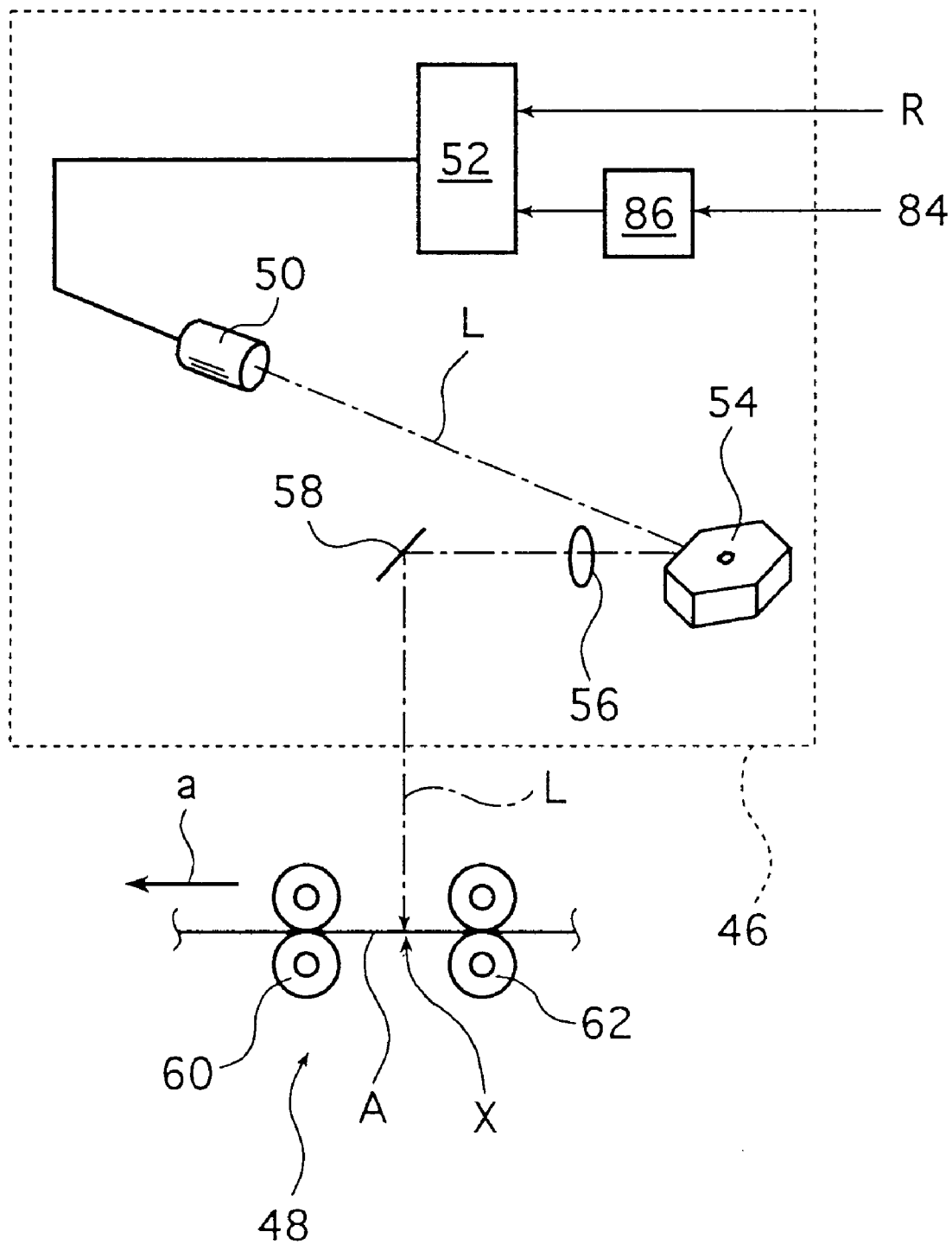
FIG. 2 shows schematically the image exposing section of the image recording apparatus shown in FIG. 1.

FIG. 2 shows the exposing section 16 in conceptual form. The exposing unit 46 is a known optical beam scanner in which an optical beam L modulated in accordance with the image to be recorded is deflected in the main scanning direction (normal to the plane of the paper on which FIGS. 1 and 2 are drawn) and allowed to be incident in a specified recording position X. The exposing unit 46 comprises a light source 50, an exposure control device 52 that drives the light source 50, a polygonal mirror 54 serving as an optical deflector, an fθ lens 56, a bend-down mirror 58 and a condition modifying portion 86.

Aside from these components, various members that are provided in known optical beam scanners are provided, as required, in the exposing unit 46 and examples of such optional members include a collimator lens and a beam expander that shape the optical beam L from the light source, tilt correcting optics and an optical path changing mirror.

The light source 50 emits optical beam L having a narrow wavelength range that suits the spectral sensitivity characteristics of the recording material A.

Image data from the image data supply source R such as MRI or CT is sent to the exposure control device 52 which performs tonal correction (density correction) on the supplied image data. In accordance with the resulting image data, or the image to be recorded, the device 52 drives the light source 50 as by pulse-width modulation, whereupon optical beam L is issued after the pulse-width modulation in accordance with the image to be recorded. The exposure control device 52 is also adapted to record image by driving the light source 50 such that an unrecorded area for detecting the fog density (which area is hereinafter referred to as "fog") can optionally be formed in a specified position on the recording material A.

The condition modifying portion 86 is a site at which the tones to be recorded are controlled in accordance with the fog density as measured with the sensor 84. In the illustrated case, a certain condition for image processing in the exposure control device 52, for example, the condition for tonal correction, is modified. This point will be elaborated later in the present specification.

It should be noted that the method of modulation to be performed in image recording with the image recording apparatus of the invention is in no way limited to the above-mentioned pulse-width modulation and another method such as pulse-numbers modulation or intensity modulation will do.

Whether recording is to be done on a light-sensitive or a heat-sensitive material, direct modulation of the light source is not the only way that can be adopted by the illustrated apparatus that uses an optical beam as the recording means; the optical beam may alternatively be subjected to external modulation with modulating devices such as an AOM (acoustic optical modulator), an EOM (electro-optical modulator) and a spatial modulating device like a liquid-crystal shutter array.

Turning back to the illustrated case, the optical beam L issued from the light source 50 after pulse-width modulation is deflected by the polygonal mirror 54 in the main scanning direction, processed by the fθ lens 56 to be focused at the recording position X and has its optical path altered by the bend-down mirror 58 to be incident at that recording position X.

The illustrated recording apparatus 10 is for monochromatic image recording and has only one light source 50 in the exposing unit 46. Of course, if the present invention is to be utilized for recording color image, the exposing unit should have three light sources that emit optical beams at wavelengths that suit the spectral sensitivity characteristics of a color light-sensitive material for R (red), G (green) and B (blue) lights.

The means 48 of transport in an auxiliary scanning direction has two transport roller pairs 60 and 62 that are provided on opposite sides of the recording position X (scanning line). The recording material A passes the recording position X as it is transported by the roller pairs 60 and 62 in an auxiliary scanning direction which is perpendicular to the main scanning direction (and indicated by arrow a in FIG. 2).

As already mentioned, the optical beam L subjected to pulse-width modulation in accordance with the image to be recorded has been deflected in the main scanning direction and, hence, the recording material A is exposed by two-dimensional scanning with the optical beam so as to record a latent image.

After the recording of a latent image in the exposing section 16, the recording material A is further transported by transport roller pairs 64 and 66 to enter the thermal developing section 18. The thermal developing section 18 is a site at which the recording material A is heated to effect thermal development so that the latent image is rendered visible; the thermal developing section 18 comprises a heating drum 68, an endless belt 70 and a peeling finger 72.

The heating drum 68 contains a heating light source such as a halogen lamp or a heat source such as an electric heater in its interior so that its surface is heated and held at a temperature associated with the temperature for thermal development of the recording material A. The heating drum 68 also rotates about a shaft 68a so that the recording material A is transported as it is held between the drum and the endless belt 70.

The heating drum 68 may be heated to a temperature of 100–140° C. if the recording material A contains a latex or to a temperature of 85–150° C. if the recording material A contains heat-responsive microcapsules. If necessary, the time of thermal development may be adjusted by varying the speed of transport of the recording material A in accordance with its type. For example, the recording material A may be thermally developed for about 10–90 seconds if it contains a latex and for about 3 to 60 seconds if it contains heat-responsive microcapsules.

The endless belt 70 is stretched on four rollers 74a, 74b, 74c and 74d and placed under pressure so that it is wrapped around the heating drum 68.

The peeling finger 72 which detaches the recording material A from the heating drum 68 is so adapted that it touches lightly or disengages from the heating drum 68 depending upon the timing of the transport of the recording material A by the heating drum 68.

After being carried into the thermal developing section 18 by means of the transport roller pair 66, the recording material A is further transported as it is held between the endless belt 70 and each of rollers 76 and 78; the recording material A which has been fed between the heating drum 68 and the endless belt 70 is further transported in synchronism with the rotating drum 68 and subjected to thermal development, whereupon the latent image recorded by exposure becomes visible.

When the advancing end of the recording material A has come close enough to the peeling finger 72, it lightly touches the heating drum 68 and enters between the drum 68 and the recording material A, causing the latter to detach from the heating drum 68.

After the thermal development ends, the recording material A is thusly detached from the heating drum 68 by means of the peeling finger 72 and subsequently taken out of the recording apparatus to be ejected into the tray 80. In the illustrated case, the light source 82 and the sensor 84 are provided between the thermal developing section 18 and the tray 80 in such a way that they are on opposite sides of the path of transport of the recording material A. As already mentioned, the recording material A is a film using a transparent support, so its density can be determined by measuring the light from the light source 82 with the sensor 84 after passage through it.

In the illustrated recording apparatus 10, the quantity of light passing through the fog formed in the exposing section 16 is measured with the light source 82 and the sensor 84 if it is necessary to modify the condition of tonal correction in relation to the fog density of the recording material A. The measured quantity of the transmitted light is sent to the condition modifying portion 86 which then calculates the fog density of the recording material A. To this end, the light source 82 and the sensor 84 are provided in association with the fog to be formed in the exposing section 16 or, alternatively, the exposing section 16 will form an unexposed area in accordance with the position of the sensor 84 or the like.

The method of measuring the fog density in the image recording apparatus of the invention is in no way limited to the case just described above and various known techniques of density measurement are applicable. If the recording material is non-transparent, the fog density may be measured on reflected light or, alternatively, it may be measured with various kinds of densitometer.

On the pages that follow, the image recording apparatus of the invention is described in greater detail with particular reference to the operation of the recording apparatus 10.

As already mentioned, the recording material A is fed into the apparatus from the supply section 12, subjected to "side registration" in the width-adjusting section 14 and thereafter transported to the exposing section 16. In the exposing section 16, the recording material A is transported in an auxiliary scanning direction by the transport means 48 as it is exposed by two-dimensional scanning with the optical beam L from the exposing unit 46 that has been modulated with the image to be recorded and which has been deflected in the main scanning direction, whereupon a latent image is formed on the recording material A.

Depending on the need, the exposing unit 46 may perform exposure in such a way that a fog (unrecorded area) for measurement of the fog density is formed in a specified position on the recording material. The fog may be formed for every image recording or, alternatively, it may be formed only when the condition of tonal correction need be modified in accordance with the fog density. The position in which the fog is to be formed is not limited in any particular way but in order to prevent wrong diagnosis and other unwanted troubles, the fog is preferably formed outside the area where the image from the image data supply source R is to be reproduced.

The recording material A having a latent image recorded thereon in the exposing section 16 is carried into the thermal developing section 18 by means of transport roller pairs 64 and 66 and further transported as it is held between the heating drum 68 and the endless belt 70 so that it is thermally developed to render the latent image visible. After the formation of the visible image, the recording material A is detached from the heating drum 68 by means of the peeling finger 72 and ejected into the tray 80.

As already mentioned, if it is necessary to modify the condition of tonal correction in accordance with the fog density of the recording material A, the quantity of light issuing from the light source 82 and which has passed through the fog is measured with the sensor 84 and sent to the condition modifying portion 86, which then calculates the fog density from the measured quantity of transmitted light. In accordance with the calculated fog density, the modifying portion 86 modifies the condition of tonal correction to be performed in the exposure control device 52.

As already noted in connection with the prior art, the fog densities of various recording materials increase with the length of time for which they are kept in a virgin state and the fog density of a particular recording material depends on various factors such as production lot. With the prior art image recording apparatus, image processing is performed under constant conditions independent of the fog density; in other words, the correspondence between the supplied image data and the recording density is fixed irrespective of the variation or mismatch in the fog density. Under these circumstances, if the fog density fluctuates or varies, the tones, particularly that in the low-density area will become soft to thereby deteriorate the quality of the image to be finally produced.

By contrast, the image recording apparatus of the invention forms a fog during image recording and its density is measured so that in accordance with the fog density of the recording material, the tones being recorded are controlled (in the illustrated case, the condition of tonal correction is modified), thereby ensuring that irrespective of the fluctuation or variation in the fog density of the recording material, prints with a record of high-quality image characterized by satisfactory tone representation in the entire density range including the low-density area can be outputted in a consistent manner.

Figure 3:
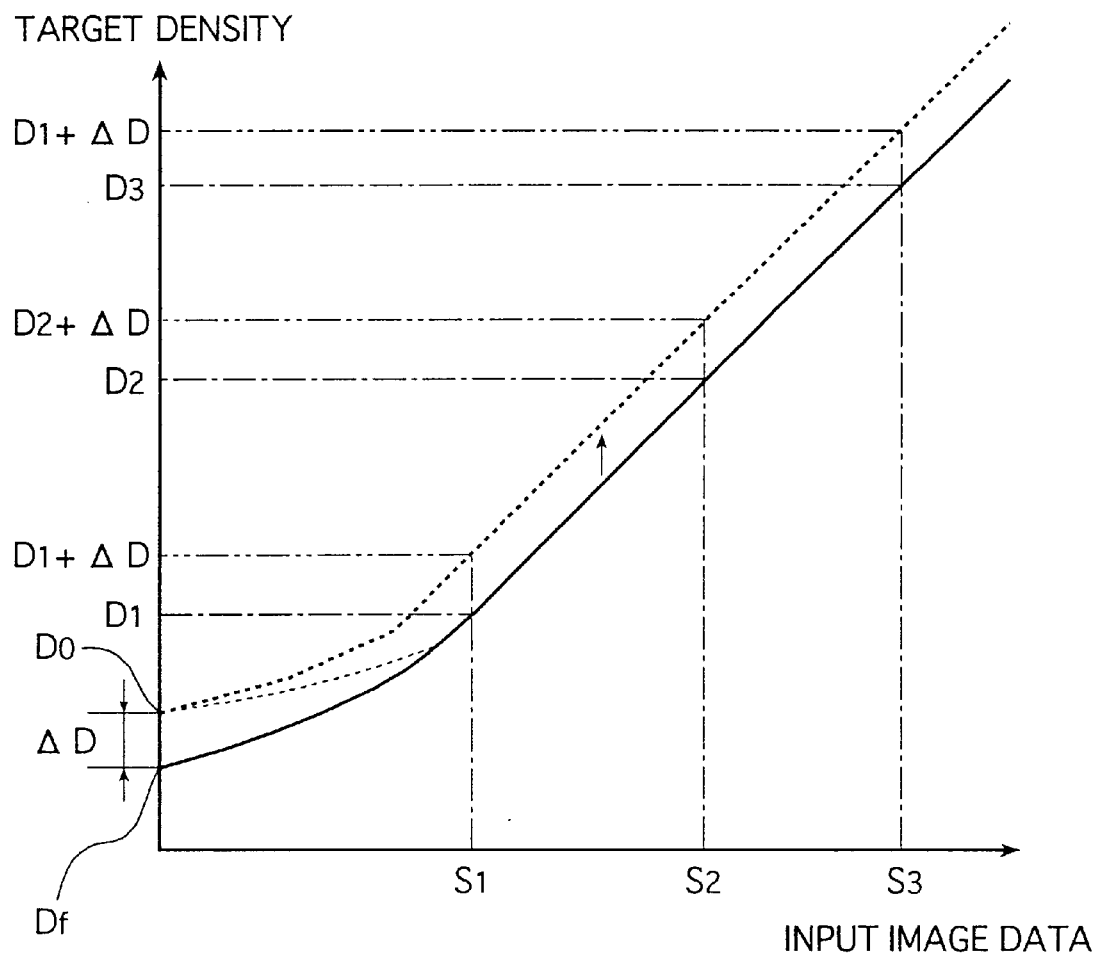
FIG. 3 is a graph showing an exemplary relationship between input image data and image density for illustrating one approach of modifying the tone correcting conditions with the image recording apparatus of the invention.

While the tones being recorded can be controlled by various methods, the following may be mentioned as a preferred method. As shown in FIG. 3, conventional image recording apparatus including the recording apparatus 10 are of such a design that the target density (appropriate density) of the image to be recorded is specified in relation to the image data supplied from the image data supply source R (which data is hereinafter referred to as "input image data"). The fog density is the image density for the position of image data 0 and in the recording apparatus 10, the standard fog density $D_f$ of the recording material A is preliminarily entered into the condition modifying portion 86.

After calculating the actual fog density of the recording material A, the condition modifying portion 86 calculates the difference between the standard fog density $D_f$ of the recording material A and the measured fog density. Consider, for example, the case where the fog density has fluctuated due to aging or some other reason, causing the color density characteristic of the low-density area (toe region) to vary as indicated by the thin dashed line; the condition modifying portion 86 then calculates the difference $\Delta D$ between the standard fog density $D_f$ and the actual fog density $D_0$.

In the next step, the condition modifying portion 86 modifies the condition of tonal correction in accordance with the calculated value of $\Delta D$.

As already mentioned, the recording apparatus 10 has the target density preset for the input image data and by applying tonal correction in accordance with the gamma-characteristic of the recording material A, the characteristics of the recording apparatus and so forth, the input image data is rendered to match the image to be recorded with the apparatus 10, thereby ensuring the recording of an image that has an appropriate tone representation in relation to the input image data.

Suppose here that the target density is preset as $D_1$, $D_2$ and $D_3$ for the input image data $S_1$, $S_2$ and $S_3$, respectively. To perform tonal correction, a tone correcting table (or function) with which the image data for recording in relation to the respective input image data are corrected (transformed) to become image data that enable the recording of an image at the target densities for the respective input image data is constructed by means of interpolation, an algorithm or the like (in other words, the condition of tonal correction is set) and the input image data are corrected by means of the thus constructed tone correcting table (or function).

If it is necessary to modify the condition of tonal correction in accordance with the fog density, the condition modifying portion 86 modifies the condition of tonal correction in such a typical way that the target densities for the respective input image data are raised by $\Delta D$. Stated more specifically, as indicated by the thick dashed line in FIG. 3, the target density is raised to $D_1+\Delta D$, $D_2+\Delta D$ and $D_3+\Delta D$ for the input image data $S_1$, $S_2$ and $S_3$, respectively. The tone correcting table preset in the exposure control section 52 is so modified as to attain these target densities; alternatively, the relevant information is outputted to the exposure control section 52 and an updated tone correcting table is constructed.

In the subsequent image recording process, tonal correction is performed on the basis of the modified or updated tone correcting table.

The image recorded after the condition of tonal correction has been thusly modified in accordance with the fog density is characterized in that the density has increased by $\Delta D$ in the entire part of the image. However, this will not cause any problem in practice since the viewer of the image does not look at its absolute density but, more often than not, observes the image on the basis of relative density differences. In addition, the fluctuation in the fog density is not so great as to "block up" the image tones over a wide density range.

Therefore, using the image recording apparatus of the invention, one can prevent the image tone in the low-density area from becoming soft in spite of the fluctuation or mismatch in the fog density and thus ensures consistent production of prints with a record of high-quality image characterized by appropriate tone representation over a wide density range including the low-density area.

Figure 4:
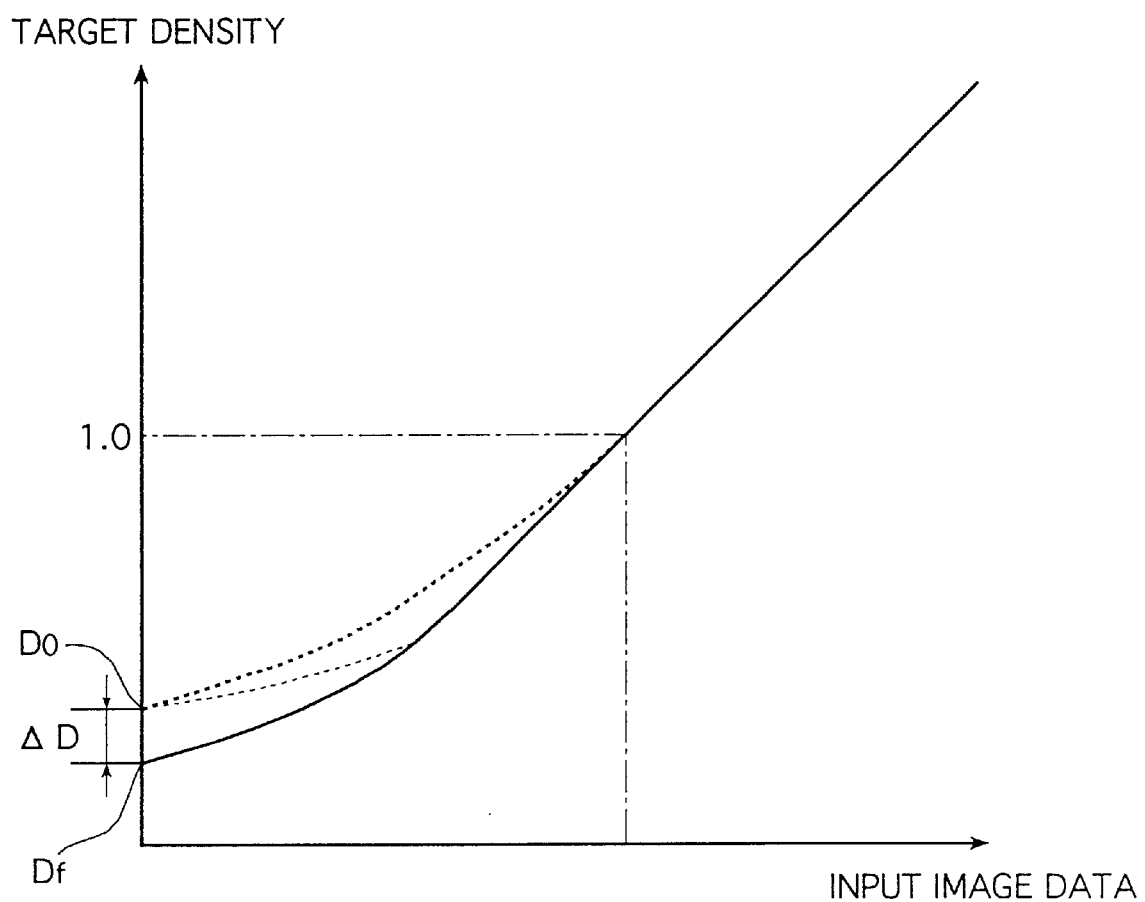
FIG. 4 is a graph showing an exemplary relationship between input image data and image density for illustrating another approach of modifying the tone correcting conditions with the image recording apparatus of the invention.

FIG. 4 shows another example of the method by which the tones to be recorded can be controlled in accordance with the fog density of a recording material being processed with the image recording apparatus of the invention. In the case shown in FIG. 3, a tone correcting table is constructed in such a way that the overall target density will be raised by $\Delta D$ which represents the variation in the fog density. In the case shown in FIG. 4, a tone correcting table is constructed in such a way that in accordance with the variation $\Delta D$ of the fog density, a minimum density in a given recording material will approach the actual fog density $D_0$ asymptotically in a density region below a specified level, rather than over the entire density range.

Stated more specifically, in the embodiment under consideration, as in the case shown in FIG. 3, a tone correcting table is preset that represents the target density in relation to various input image data (the table is indicated by the solid line in FIG. 4). Based on the assumption that the color density characteristic of the low-density area has fluctuated as indicated by the fine dashed line, the difference $\Delta D$ between the standard fog density $D_f$ and the actual fog density $D_0$ is calculated.

Then, in accordance with the calculated difference $\Delta D$, the tone correcting table preset in the exposure control section 52 is modified or an updated table is constructed in such a way that in a density region below a specified level, preferably below 1.0 in terms of density D, the target density for decreasing input image data will approach the actual fog density $D_0$ asymptotically as indicated by the thick dashed line. Tonal correction in the subsequent image recording process is performed by reference to the modified or updated correction table.

According to the embodiment shown in FIG. 4, the problem of the production of a "soft" image tone in the low-density area due to the variation in fog density is effectively prevented to ensure the outputting of prints that reproduce a high-quality image characterized by appropriate tone representation over a wide density range from the low- to high-density area. What is more, in a density region exceeding the level 1.0 where images important for practical purposes are to be reproduced, an image of the appropriate density preset for the recording apparatus can be reproduced independently of the variation in the fog density.

Hence, the invention is applicable not only to users who have to manage or otherwise control image densities in relation to image data but also to users who store prints outputted from different printers using the same image data or those produced before adjustment of the tone correcting table. These users will benefit a lot from the invention without being bothered by the variation and mismatch in image density.

The timing at which the image recording apparatus of the invention modifies the conditions of image processing in accordance with the fog density is not limited in any particular manner; the modification may be performed each time image recording is done or in response to a variation in the fog density; it may be performed when the first recording is done after the loading of magazine 20 accommodating a new bundle of the sheets of recording material A or when the first recording is done after replacement of magazine 20; it may be initiated by user's instructions in response to a certain event such as the deterioration of image quality. If desired, the modification may be performed at times which are combinations of the timings just mentioned above.

The image recording apparatus of the invention may also be adapted to be such that the image processing conditions are modified automatically upon replacement of magazine 20 or loading of a new bundle of the sheets of recording material A. The loading of a new bundle of the sheets of recording material A may be detected by various events such as the magazine 20 having become empty.

While the image recording apparatus of the invention has been described above in detail, it should be noted that the invention is by no means limited to the embodiments described on the foregoing pages and various improvements and modifications can of course be made without departing from the scope and spirit of the invention.

As described above in detail, the present invention provides an image recording apparatus that uses various recording materials including light-sensitive materials and thermal recording materials and which, in spite of the fluctuation in the fog density of a particular recording material or the difference in characteristics between production lots and other identifications of the recording material, is capable of consistent recording of high-quality images that assure satisfactory tone representation over the entire density range including low densities.

What is claimed is:

1. An image recording apparatus that performs image recording on a recording material to output a print with a record of a visible image, which comprises a means of outputting said print having printed thereon a minimum density in said recording material, a means of measurement for measuring said minimum density that has been recorded on said print, and a control means by which tones to be recorded are controlled in accordance with the minimum density measured by said means of measurement, wherein the tones to be recorded are controlled by said control means which determines a difference between said measured minimum density and a standard minimum density of said recording material and raises an image density over an entire density range or in a partial density range in accordance with the thus determined difference.

2. The image recording apparatus according to claim 1, wherein the image density is raised over the entire density range by increasing a target density value of the recorded image by said difference.

3. The image recording apparatus according to claim 1, wherein the partial density range is a range of target density values that are less than a predetermined density value, and the image density is raised over the partial density range such that the target density values asymptotically approach said predetermined density value from said measured minimum density.

4. The image recording apparatus according to claim 3, wherein said predetermined density value is 1.0.

5. The image recording apparatus according to claim 1, wherein said recording material is a light- and heat-sensitive recording material, and said apparatus further comprises a plurality of supply trays for accommodating the recording materials.

6. The image recording apparatus according to claim 5, said supply trays accommodate the recording materials of different sizes, respectively.

7. An image recording apparatus that records an image on a recording material, comprising:

an exposing unit that records said image on said recording material at least indirectly based on input image data, wherein said image is recorded on said recording material in accordance with a minimum density;

a sensor that measures said minimum density of said image that has been recorded on said recording material; and a controller that controls tones to be recorded based on said minimum density measured by said sensor, wherein said controller determines a density difference between said minimum density measured by said sensor and a standard minimum density of said recording material, and wherein said controller adjusts an image density with which said exposing unit records said image based on said density difference.

8. The image recording apparatus according to claim 7, wherein said controller adjusts said image density by adjusting a range of density values of said image density corresponding to a range of said input image data based on said density difference.

9. The image recording apparatus according to claim 8, wherein said controller adjusts said image density by increasing an entire range of density values of said image density by said density difference corresponding to an entire range of said input image data.

10. The image recording apparatus according to claim 8, wherein said range of density values is a partial range of density values that is less than an entire range of said density values of said image density.

11. The image recording apparatus according to claim 10, wherein said controller adjusts said partial range of density values by increasing said density values in said partial range such that said partial range of density values asymptotically approach a predetermined density value from said measured minimum density.

12. The image recording apparatus according to claim 11, wherein said predetermined density value of said measured minimum density equals 1.0.

13. An image recording method for recording an image on a recording material, comprising:

(a) recording said image on said recording material at least indirectly based on input image data, wherein said image is recorded on said recording material in accordance with a minimum density;

(b) measuring said minimum density of said image that has been recorded on said recording material; and (c) controlling tones to be recorded based on said minimum density measured in said step (b), wherein said step (c) comprises:

(c1) determining a density difference between said minimum density measured in said step (b) and a standard minimum density of said recording material; and (c2) adjusting an image density with which said image is recorded on said recording medium based on said density difference.

14. The method according to claim 13, wherein said step (c2) comprises:

(c2a) adjusting said image density by adjusting a range of density values of said image density corresponding to a range of said input image data based on said density difference.

15. The method according to claim 14, wherein said step (c2a) comprises:

(c2a1) adjusting said image density by increasing an entire range of density values of said image density by said density difference corresponding to an entire range of said input image data.

16. The method according to claim 14, wherein said range of density values is a partial range of density values that is less than an entire range of said density values of said image density.

17. The method according to claim 16, wherein said step (c2a) comprises:

(c2a1) adjusting said partial range of density values by increasing said density values in said partial range such that said partial range of density values asymptotically approaches a predetermined density value of said measured minimum density.

18. The method according to claim 17, wherein said predetermined density value of said measured minimum density equals 1.0.

19. An image recording apparatus that performs image recording on a recording material to output a print with a record of a visible image, which comprises a means of outputting said print having printed thereon a minimum density in said recording material, a means of measurement for measuring said minimum density that has been recorded on said print, and a control means by which tones to be recorded are controlled in accordance with only the minimum density measured by said means of measurement.

20. An image recording apparatus that records an image on a recording material, comprising:

an exposing unit that records said image on said recording material at least indirectly based on input image data, wherein said image is recorded on said recording material in accordance with a minimum density;

a sensor that measures said minimum density of said image that has been recorded on said recording material; and a controller that controls tones to be recorded based only on said minimum density measured by said sensor.

21. An image recording method for recording an image on a recording material, comprising:

(a) recording said image on said recording material at least indirectly based on input image data, wherein said image is recorded on said recording material in accordance with a minimum density;

(b) measuring said minimum density of said image that has been recorded on said recording material; and (c) controlling tones to be recorded based only on said minimum density measured in said step (b).

* * * * *